W. ASHCROFT.
TIRE.
APPLICATION FILED NOV. 23, 1918.
1,315,001.
Patented Sept. 2, 1919.
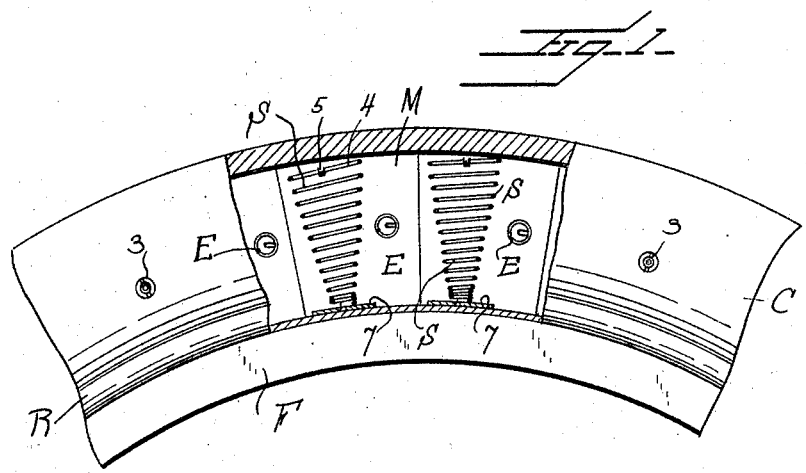
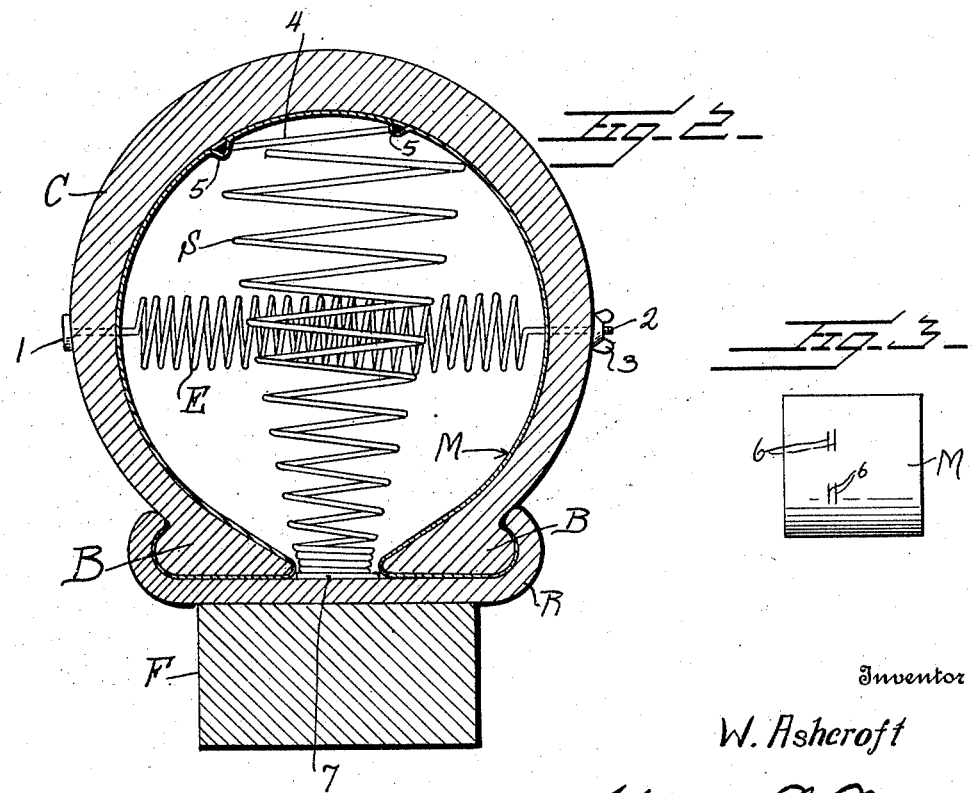
Inventor
W. Ashcroft
By Watson E. Coleman
Attorney

UNITED STATES PATENT OFFICE.

WILLIAM ASHCROFT, OF GARSON QUARRY, MANITOBA, CANADA.

TIRE.

1,315,001.  Specification of Letters Patent.  Patented Sept. 2, 1919.

Application filed November 23, 1918. Serial No. 263,909.

*To all whom it may concern:*

Be it known that I, WILLIAM ASHCROFT, a citizen of the United States, residing at Garson Quarry, in the Province of Manitoba and Dominion of Canada, have invented certain new and useful Improvements in Tires, of which the following is a specification, reference being had to the accompanying drawings.

This invention relates to certain improvements in tire structures, and it is an object of the invention to provide a device of this general character wherein the same will possess requisite cushioning or resiliency without the use of air, so that the possibility of blow-outs or the like is eliminated.

It is also an object of the invention to provide a novel and improved tire structure wherein the same, when in applied position, is subjected both to radial and lateral tension so that the efficiency of the tire is materially increased.

An additional object of the invention is to provide a tire of this general character having novel and improved means whereby the tire, when in applied position, may be properly shaped, and particularly to obviate bulging of the tire when free of load.

The invention consists in the details of construction and in the combination and arrangement of the several parts of my improved tire whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:

Figure 1 is a fragmentary view partly in side elevation and partly in section showing a tire constructed in accordance with an embodiment of my invention;

Fig. 2 is an enlarged transverse sectional view taken through the tire as illustrated in Fig. 1;

Fig. 3 is a view in top plan of one of the members or shoes as herein disclosed.

As disclosed in the accompanying drawings, R denotes a rim preferably of a clencher type and which is mounted in any desired manner upon a felly F. C denotes a tire casing of conventional form, and which is provided with the beads B coacting with the rim R.

Arranged within the casing C and closely contacting with the inner face thereof are the members or shoes M, formed preferably of metal and possessing a certain degree of inherent resiliency. The ends of each of the members or shoes M are conformed to surround or embrace the beads B so that in practice said member or shoe M is effectively maintained in applied position. While I herein disclose a plurality of members or shoes M, it is to be understood that if preferred, the same may comprise a continuous band, and in view of the obvious change it is not believed that a detailed description and illustration of this latter arrangement is necessary.

Each of the members or shoes M has interposed between the side walls thereof a retractile member E which serves to impart inward movement thereto to facilitate a proper coaction of the beads B with the rim R and to maintain the casing C in its desired form.

The member E as herein disclosed constitutes a coiled spring and one end thereof is disposed through a side wall of the member or shoe M and the adjacent side wall of the casing C and the extremity thereof is provided with an enlargement or head 1 whereby the movement of said end portion of the member E inwardly of the casing C is limited.

The opposite end portion of the member E is extended through the adjacent side portion of the member or shoe M and the coacting side wall of the casing C and terminates exteriorly of the casing. In threaded engagement with said extended portion 2 is a winged nut 3 or the like having contact with the outer surface of the casing C which is adapted to be rotated in order to draw the sides of the casing C inwardly in the event there should be bulging of the casing C when in applied position. It will also be self-evident that the nut 3 also serves as a medium whereby the tension of the member E may be regulated.

S denotes a radially disposed expansible member and preferably comprising a coiled spring of substantially a cone formation with its larger end outwardly directed. The outer convolution or fake 4 of the member E is threaded through the inwardly directed eye members 5 carried by the member or shoe M. In practice it is preferred that the members 5 be formed by producing in the tread portion of the member or shoe M pairs of slits 6 and forcing the portions of the member or shoe M therebetween inwardly.

The inner or smaller end of the member S is anchored at or secured to substantially the longitudinal center of the elongated foot member or plate 7 which is adapted to have contact with the outer surface of the rim R and between the inner edges of the casing C or more particularly the member or shoe M.

The resiliency possessed by each of the members or shoes M together with the tension of the expansible members or springs S result in the casing C, when in applied position, possessing sufficient cushioning action to materially absorb the shocks and jars incident to the travel of the wheel structure to which my improved tire may be applied and with substantially the same efficiency possessed by an inflated tire. The cushioning action of my improved tire is also materially facilitated by the transversely disposed members E and particularly in view of the fact that the tension of said members E may be regulated.

From the foregoing description, it is thought to be obvious that a tire constructed in accordance with my invention is particularly well adapted for use by reason of the convenience and facility with which it may be assembled and operated, and it will also be obvious that my invention is susceptible of some change and modification without departing from the principles and spirit thereof, and for this reason I do not wish to be understood as limiting myself to the precise arrangement and formation of the several parts herein shown in carrying out my invention in practice except as hereinafter claimed.

I claim:

1. A tire structure comprising a casing adapted to be engaged with the rim of a wheel, radially disposed expansible members within the casing and coacting with the tread portion thereof and the wheel rim when the tire is in applied position, transversely disposed retractile members connecting the sides of the casing, each of said retractile members having an end portion loosely disposed through a side of the casing, and a member in threaded engagement with said end portion and having contact with the outer face of the casing.

2. A tire structure comprising a casing provided with marginal beads, a plurality of shoes arranged within the casing and closely contacting therewith, the outer marginal portions of each of the shoes embracing the beads, radially disposed expansible members arranged within the casing and supported by the tread portion, and transversely disposed retractile members coacting with the shoes and side portions of the casing.

3. A tire structure comprising a casing adapted to be engaged with the rim of a wheel, members within the casing and coacting with the tread portion thereof for constantly urging the same outwardly, members coacting with the side portions of the casing for exerting inward pull upon said side portions when the casing is under load, and means for adjusting the tension of said last named members.

In testimony whereof I hereunto affix my signature in the presence of two witnesses.

WILLIAM ASHCROFT.

Witnesses:
 THOMAS ASHCROFT,
 FRANK W. ALTY.

Copies of this patent may be obtained for five cents each, by addressing the "Commissioner of Patents, Washington, D. C."